United States Patent

Kobayashi et al.

[15] 3,669,095
[45] June 13, 1972

[54] CATHETER-TYPE SEMI-CONDUCTOR RADIATION DETECTOR FOR INSERTION INTO A HUMAN BODY

[72] Inventors: Tetsuji Kobayashi, Yokohama-shi; Seiichi Takayanagi, Tokyo; Tohru Sugita, Yokohama-shi, all of Japan

[73] Assignee: Tokyo Shibaura Electric Co., Ltd., Kawasaki-shi, Japan

[22] Filed: Aug. 22, 1967

[21] Appl. No.: 662,463

[30] Foreign Application Priority Data

Aug. 25, 1966 Japan...............................41/79743
Nov. 14, 1966 Japan...............................41/74423
March 16, 1967 Japan..............................42/16082

[52] U.S. Cl. ..................128/2.1 R, 174/107 R, 174/110 FC, 128/2.05 F, 174/102 P, 128/DIG. 14, 128/DIG. 18
[51] Int. Cl. ......................................................A61b 5/04
[58] Field of Search.............128/2, 2.1, 2.05, 2.05 D, 2.05 F, 128/404, 418, 419 P; 174/106.2, 107, 110.6, 102.2

[56] References Cited

OTHER PUBLICATIONS

Aviation Week 5/28/62
Teflon Coaxial Cable 3/1/56 p. 36–37

Primary Examiner—Richard C. Pinkham
Assistant Examiner—Marvin Siskind
Attorney—Stephen H. Frishauf

[57] ABSTRACT

A catheter type semiconductor radiation detector is comprised by a semiconductor detector adapted to be inserted in a human body to detect radiations to convert them into electric signals, and a coaxial cable adapted to transmit said converted electric signals to an external measuring device for detected outputs. The coaxial cable includes a layer of carbon powders interposed between an insulating layer adjacent a core conductor and a shield conductor.

10 Claims, 12 Drawing Figures

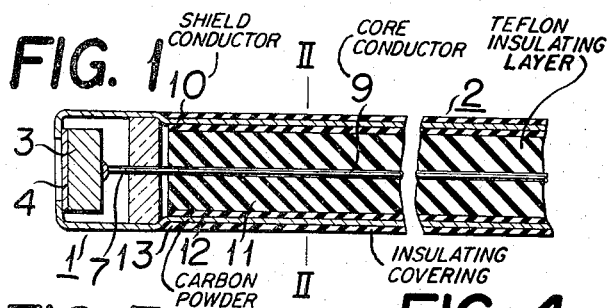
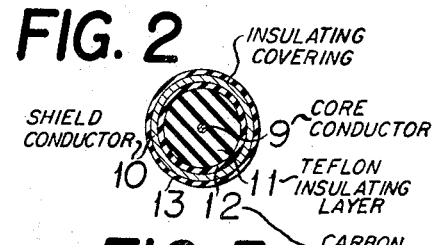
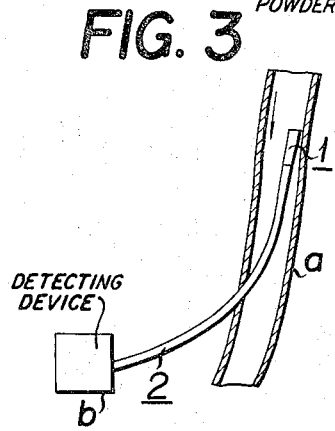
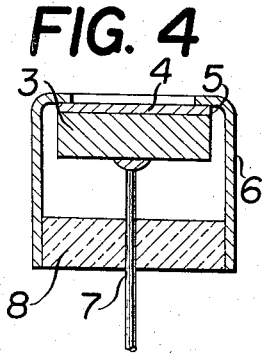
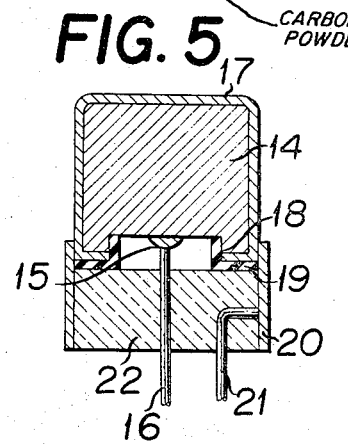
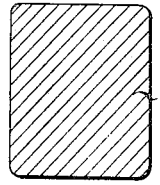
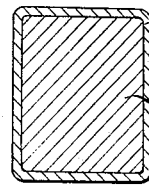
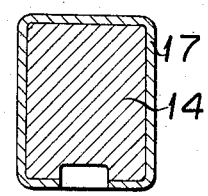
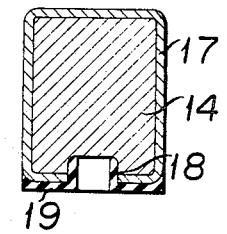
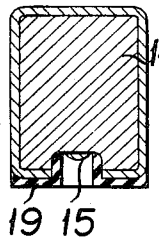
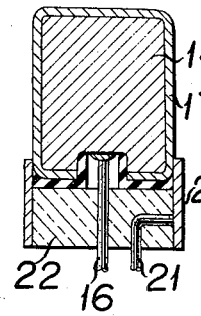
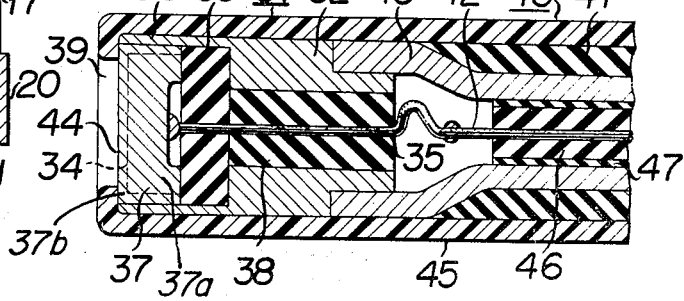

CATHETER-TYPE SEMI-CONDUCTOR RADIATION DETECTOR FOR INSERTION INTO A HUMAN BODY

BACKGROUND OF THE INVENTION

This invention relates to a semiconductor radiation detector and more particularly to a novel catheter type detector having an excellent detecting ability.

It is well known to diagnose heart, liver or other internal organs by a method including the steps of injecting into a body radioactive isotopes of iodine, potassium, kripton and the like, and detecting such isotopes by means of a radiation detecting element inserted in the body to determine the condition of blood flow as well as the degree of absorption in the body of said isotopes. To this end there has been used a catheter type radiation detector utilizing a detecting element consisting of a small G.M. tube. (Geiger-Muller tube). In this specification the term "catheter" means tubular body that can be inserted in the body. One of the disadvantages of the detector utilizing the G.M. tubes is its short life, usually from several hours to few days. This is caused by extremely small dimensions of the G.M. tube, for example, 2 to 15 mm diameter and 8 to 20 mm long, so that it is impossible to use a sufficient quantity of quenching gas. Another disadvantage is that as the G.M. tube requires operating voltages of from 500 to 1,000 V, any leakage in the body causes a very dangerous condition. A still further disadvantage is that the tube wall of such a small G.M. tube is comprised by a metallic material such as stainless steel and the like, with the result that radiations to be detected are absorbed by said metal wall. As a result, the type of radiations that can be satisfactorily used is greatly limited. Thus, for example, among various β-rays, only high energy β-rays alone can be sensed with good sensitivity.

Various disadvantages mentioned above can be obviated by employing P-N junction type semiconductor detecting element as the detecting element. Such a detecting element can be constructed to have a small size in comparison with the G.M. tube. Moreover such a detecting element is very durable. The useful life of the semiconductor radiation detecting element is determined by the degree of damage caused by irradiation of radioactive radiations, and in the case of β-rays it is assumed now that the life is reached when the integrated radiation dose reaches $10^{10}$/cm$^2$ (the irradiated area of the detector element is represented by cm$^2$). From the standpoint of clinical diagnosis, since the irradiation time per day is about 8 hours and since it is considered that the mean irradiation dose of β-rays is less than $10^4$ counts/sec/cm$^2$ the life may be longer than about 35 days for such use which is extremely longer than that of small G.M. tubes. Since the operating voltage of the P-N junction type semiconductor detecting element is about 10 to 50 volts and since the operating voltage is impressed through an external protective resistance of the order of several tens of mega-ohms, the magnitude of the current flowing through the human body can be limited to less than several microamperes upon occurrence of leakage. It is recognized that flow of current of the order of 180 to 200 microamperes results in cramp causing accidents but currents less than 10 microamperes are not dangerous. Thus, the semiconductor detecting element is safer than G.M. tubes. Moreover, the type of the source of radiation to be detected is greatly broadened than G.M. tubes. This is because that the thickness of the insensitive surface layer (N-type layer) of the P-N junction type semiconductor detecting element is only about 2 microns. Thus, β-rays of about 15 KeV is able to pass through the surface layer, thus enabling lower energy β-rays (as low as about 100 KeV) to be effectively detected.

However, because of the small size of the semiconductor radiation detecting element, its area sensitive to radioactive rays is limited and its output is small. As a consequence it is highly desirable to remove as far as possible noises caused by signal lines which serve to transmit the output signal to a pre-amplifier located outside of the body. For example, in the case where a voltage of 10 to 50 V is applied to a P-N junction element utilizing P type silicon having a resistivity of 6,000 ohm-cm, the thickness of the depletion layer would be about 70 to 160 microns and the energy loss in this depletion layer would amount to about 100 to 150 KeV. When such a detection element is inserted in a human body and its output is transmitted to a pre-amplifier outside of the body through a coaxial cable having a length of one meter and an electric capacity of 80pf/m, the magnitude of the input signal arriving at the amplifier is only from 57 to 80 microvolts. Accordingly it is necessary to reduce the noise generated in said coaxial cable to a value below said signal voltage, for example, to about 10 microvolts.

However, in the conventional semiconductor radiation detectors wherein said conventional coaxial cable is used as the signal line for transmitting the output to the outside of the body it was found that bending and vibration of the coaxial cable caused by aspiration or variation in the body position would cause burst noise or sudden noise of the magnitude ranging from several millivolts to several tens of millivolts, thus rendering impossible accurate detection.

SUMMARY OF THE INVENTION

According to this invention there is provided a catheter type semiconductor radiation detector comprising a radiation detecting member adapted to be inserted in a human body including a semiconductor radiation detecting element, and a housing member to hold said detecting element, and means to apply voltage to said element and to derive radiation detection signals therefrom, and a coaxial cable connected to the terminals of said detecting member, said coaxial cable including a layer of carbon powders between an insulator layer surrounding a core conductor and a shield conductor, thus preventing generation of noise due to bending or flexure of said coaxial cable.

BRIEF DESCRIPTION OF THE DRAWINGS

FIG. 1 is a diagrammatic representation of a longitudinal section of one embodiment of this invention;

FIG. 2 is an enlarged cross-sectional view, along line II—II, of the coaxial cable utilized in the apparatus shown in FIG. 1;

FIG. 3 is a diagrammatic representational view showing a manner of use of the novel apparatus;

FIG. 4 is an enlarged sectional view of the detecting member of the apparatus shown in FIG. 1;

FIG. 5 is an enlarged sectional view of a modified detecting member;

FIG. 6a through FIG. 6f show enlarged sectional views to explain various steps of manufacturing the detecting member shown in FIG. 5; and FIG. 7 depicts an enlarged sectional view of a modified embodiment of this invention.

DESCRIPTION OF THE PREFERRED EMBODIMENTS

One embodiment of the invention will be explained according to the accompanying drawings.

FIG. 1 is a diagrammatic representation of the novel semiconductor radiation detector comprising a detector member 1 adapted to detect radiations to convert the intensity thereof into a corresponding electric signal and a signal wire or a coaxial cable 2 adapted to transmit this converted electric signal to an exterior measuring device to measure the detected output.

More particularly, as shown in FIG. 4, the detector member 1 comprises a P-N junction type semiconductor element having a P-type silicon substrate 3, the upper portion thereof being diffused with phosphorous to form an N-layer 4 thus forming a P-N junction 5. The semiconductor element is contained in a metal housing 6 made of nickel and the like with the peripheral edge of the upper portion of the N-type layer 4 firmly urged against the periphery of an opening formed at the upper part of the housing 6. This housing is also utilized as an electro-conductor for the N-type layer, a lead wire 7 is connected to the rear side of the P-type layer to form an electrode and the interior of the housing is hermetically sealed by means of an insulator 8 such as glass and the like. Alternatively, the semiconductor element of this detector may have reversed P and N layers or may be N-P type.

At one end of the signal line or coaxial cable 2, a core conductor 9 thereof is connected to the lead wire 7 and the shield conductor 10 to the metallic housing 6, respectively. The opposite end of the cable is connected to a source of supply for the detector element and to the measuring device of the detected output. As shown in the enlarged view shown in FIG. 2 the coaxial cable 2 comprises the core conductor 9, an intermediate insulating layer 11 made of Teflon (trade mark) polyfluoroethylene fiber, closely adhering to the core conductor 9, a layer of powdered conductor 12, such as carbon powder, the grounded shield conductor 10 closely surrounding the powdered conductor layer 12 and an insulating covering 13.

The coaxial cable is made to have a suitable flexibility because it is utilized to insert and extract the detector member to and from the inside of a body.

To insert the novel detector into a blood vessel $a$, for example, one end of the signal line 2 is led out of the body and is connected to a detecting device $b$, as shown in FIG. 3, comprising a dc source, and amplifier for the detected signal, counting device and the like.

When the novel detector is inserted in a desired portion of a human body with the operating voltage applied across the detector element through the core conductor 9 and shield conductor 10, the element will produce a detection signal responsive to the quantity of the radiations in the body, which is transmitted to a pre-amplifier outside the body through the coaxial cable. Since the layer 12 of powdered conductor is in intimate contact with the shield conductor and the insulator layer 11, the shield conductor 10 and the insulator layer are always maintained at a constant condition regardless of partial variation in the contact therebetween due to bending, vibration or any other cause. Accordingly, noises caused by bending, vibration, etc., of the coaxial cable are greatly reduced when compared with conventional cables not employing layers of powdered electro-conductor. Results of investigations made on animals showed that it was possible to reduce burst noises due to such causes to less 10 $\mu V$. In addition, the detector has various other advantages inherent to semiconductor radiation detectors.

FIG. 5 shows a modified detector member of the device according to the invention. Numeral 14 designates a P-type silicon semiconductor substrate having an ohmic contact 15 at substantially the center of the lower surface thereof, said ohmic contact being connected with one of the lead wires 16. The surface of the substrate except its region formed with the ohmic contact 15 is covered by an $N^+$-type thin layer 17 (a layer having higher impurity concentration than N-type). A P-$N^+$ junction is formed between substrate 14 and $N^+$-layer 17, said junction being exposed at 18 near the periphery part of the ohmic contact 15. If desired, the exposed junction may be protected by a film of $SiO_2$, for example, as is well known in the art. A nickel sleeve 20 having a lead wire 21 is connected to one end of the $N^+$-layer 17. Within the bushing 20 is filled a suitable insulating filler compound 22, for example, or glass to hold in position lead wires 16 and 21, and to seal air-tightly in the sleeve 20.

The embodiment shown in FIG. 5 may be fabricated according to process steps shown in FIG. 6. These steps are: (a) a P-type high purity single crystal of silicon worked by a supersonic working machine to form a semiconductor substrate 14 having outside diameter of 5 mm and a height of 5 mm; (b) after subjecting the substrate 14 to a conventional chemical treatment, phosphorous, for example, is diffused to form an $N^+$-layer 17 over the entire surface of the substrate; (c) then a portion of the $N^+$-layer 17 on one side is removed to expose the substrate 14; (d) an $SiO_2$ film 19 is deposited on the portion of the $N^+$-layer 17 and an exposed $P$-$N^+$ junction to protect the exposed P-N junction 18 against moisture and the like; (e) aluminum is alloyed to the exposed surface of the substrate 14 to form the ohmic contact 15; and (f) one of lead wires 16 is electrically connected to the ohmic contact 15, a nickel sleeve 20 is soldered to the $N^+$-layer 17 to form an ohmic contact, the other lead wire 21 is connected to the sleeeve 20 and then an insulating filler 22 is filled in the sleeve 20.

Again, lead wires 16 and 21 are respectively connected to the core conductor 19 and to the shield conductor 10 of a flexible coaxial cable as shown in FIG. 2, and after applying an airtight film or other necessary protective means, to its connection part, the detector can be inserted in the body.

According to this modified embodiment the efficiency of detection of the detecting element is greatly increased because the radiation receiving surface is provided substantially over the entire outer surface of the substrate, in other words, because the radiation area is very wide when compared with effect against the geometrical configuration of the substrate. Further, as the exposed area of the P-N junction is very small because it is only limited to portions around the ohmic contact 15. As a result, deterioration of the detecting element caused by blood or gastric juice of living bodies can be greatly reduced.

FIG. 7 shows a still further modification of this invention. The radiation detector member 31 shown in FIG. 7 comprises a supporting sleeve 32 of metal, and an insulator disc 33, made of a Teflon plate, for example, and received in a greater upper opening of the supporting member 32, and a silicon semiconductor radiation detecting element 37 mounted on the insulator disc, said detecting element 37 having a P-type sublayer 37$a$, an N-type sublayer 37$b$ formed thereon except the part mounted on said disc 32 and a P-N junction 34 which is effective to detect radioactive rays, said P-region 37$a$ being electrically connected to a lead wire 35 inserted through the disc 32 in the sleeve and said N-region 37$b$ being electrically connected to an inner wall of said electrode sleeve 32. The supporting member 32 and the lead wire 35 are insulated by a suitable insulator 38 such as Araldite (trade mark). The lower portion of the electrode sleeve 32 has a smaller diameter than that of the central portion so that it can be readily inserted in a sheild conductor as will be described later. A signal transmitter 40 adapted to transmit to the outside of a body detected signals which are generated by radiation received through a radiation incident window 39 comprises a flexible catheter, (by the term "catheter" is meant herein a tubular member that can be inserted in human bodies.) Ödwon-hedin Cather (KIFA)– 4 (trade name) made in Sweden is suitable for this purpose and a coaxial cable inserted in the catheter. The coaxial cable is shown as comprising a core or central conductor 42 and an outer conductor or a shield 43 insulated therefrom by means of a conventional insulator 46 and a layer of powdered carbon conductor 47. Electrical connection between the detector member 31 and the detected signal transmitter 10 is made as follows. The lead wire 35 is made flexible and is cut to a length longer than required. The lead wire is then connected to the core conductor 42 by a conventional method and thereafter the lower end of the supporting member 32 is electrically fitted in the outer conductor 43 thus leaving the lead wire somewhat slackened. After this operation, a thin silicon rubber film 44 is applied on the exposed surface of the N-layer of the detector element 37, and then the assembly is inserted into a heat shrinkable resin tube, for example, heat shrinkable polyethylene tube 45, and uniformly heated to cause the tube 45 to shrink. Care should be taken to expose the radiation incident window 39 in order to receive effectively incident radiations thereat. The silicon rubber film 44 is effective to prevent blood from coagulating on the surface of N-type layer when the novel detector is inserted in a blood vessel, but it may be eliminated where the detector is utilized in a stomach, for example, where it does not contact with blood.

In some applications the catheter 41 at the signal transmitter 40 may be omitted and heat shrinkable resinous coating may be directly applied upon the outer conductor 43 but where the detector is to be inserted in the body with its detection window positioned at an inclined position dependent upon the portion to be detected, it is convenient to provide the catheter. This is because after heating and bending at a desired portion, the catheter maintains its bent configuration upon cooling. Heat shrinkable resinous layer should be applied to portions which are required to be rendered water tight except said radiation incident window. Accordingly, for a device not provided with catheter 41, it is advisable to provide such a resinous layer over the entire length of the element to be inserted in the body. For the detector utilizing the catheter, the resinous coating may be omitted at a portion thereof which is to be inserted in the body and where the transmitter is provided. Because the catheter itself is water tight and upon heat shrinkage catheter 41 and the tube 45 come into intimate contact to form a water tight bond therebetween.

According to this embodiment there are the following merits in addition to those described in connection with the previous embodiment. More particularly, excellent water tight construction can be provided by merely disposing various elements in the heat shrinkable tube and then heating. Moreover, since no metallic portion is exposed, there is no fear of causing coagulation of blood. By elimination of exposed metal parts, or encapsulation thereof by a resinous coating, damage is not caused to the tissues of the body.

What is claimed is:

1. A catheter type semiconductor radiation detector comprising:
   a radiation detecting member adapted to be inserted in a human body including a semiconductor radiation detecting element; a housing member holding said detecting element; and means to apply a voltage to said detecting element and to derive out electrical signals detected by said detecting element; and
   a coaxial cable connected to said radiation detector, said coaxial cable including a core conductor connected to said detecting element; an insulator layer made of polyfluoroethylene surrounding said core conductor; a shield conductor surrounding said insulator layer; and a high conductivity layer consisting of carbon powder interposed between said insulator layer and said shield conductor.

2. The catheter type semiconductor radiation detector according to claim 1 wherein said semiconductor radiation detecting member comprises a first semiconductor substrate of one conductivity type, a lead wire connected to said substrate through an ohmic contact, a second semiconductor layer of the other conductivity type, said second semiconductor layer covering substantially the whole surface of said semiconductor substrate except said ohmic contact, thus forming a P-N junction in cooperation with said substrate, and an electrode connected electrically to said second semiconductor layer.

3. The catheter type semiconductor radiation detector according to claim 2 wherein said electrode connected to the second semiconductor layer is formed with a metal sleeve, said second layer being connected to the sleeve at one end thereof.

4. The catheter type semiconductor radiation detector according to claim 2 wherein said semiconductor layer having said other conductivity type is a high resistance layer.

5. The catheter type semiconductor radiation detector according to claim 2 wherein the exposed portion of said P-N junction is coated by a protective coating.

6. The catheter type semiconductor radiation detector according to claim 1 wherein portions of the periphery of said radiation detector and said coaxial cable are covered by a heat shrinkable resinous layer to provide a water tight construction.

7. The catheter type semiconductor radiation detector according to claim 1 wherein said semiconductor radiation detecting member comprises a first semiconductor substrate of a first conductivity type; a second semiconductor layer of a second conductivity type covering at least a portion of said first semiconductor substrate; a lead wire connected to an uncovered portion of said first semiconductor substrate by means of an ohmic contact; and an electrode connected to said second semiconductor layer, a P-N junction being formed between said substrate and said second layer.

8. The catheter type semiconductor radiation detector according to claim 7 wherein said lead wire is electrically connected to said core conductor of said coaxial cable.

9. The catheter type semiconductor radiation detector according to claim 7 further comprising a metallic housing accomodating said semiconductor detecting member, said housing being electrically connected to said second semiconductor layer to comprise said electrode, said housing having an opening therein for exposing at least a portion of said second semiconductor layer to said radiation.

10. The catheter type semiconductor radiation detector according to claim 8 wherein said housing is electrically connected to said shield conductor of said coaxial conductor.

* * * * *